Patented June 21, 1949

2,474,010

UNITED STATES PATENT OFFICE

2,474,010

PLASTICIZER

Latimer D. Myers and J. D. Fitzpatrick, Cincinnati, Ohio, assignors to Emery Industries, Inc., Cincinnati, Ohio, a corporation of Ohio No Drawing. Application July 22, 1946, Serial No. 685,369

13 Claims. (Cl. 260—398)

This invention relates to plasticizers for synthetic resins and more particularly to solvent type plasticizers for thermoplastic resins and other resins.

A principal objective of this invention has been to produce a good, inexpensive plasticizer for synthetic resins.

By the term synthetic resins we mean those high molecular weight materials which are obtained by the polymerization of one or more types of short chain molecules and we refer particularly to that class of resins known as thermoplastics, that is, resins which can be worked and formed under heat or heat and pressure without becoming infusible and insoluble under these conditions.

In this application the term plasticizer is used to describe a material which may be mixed with a resin to facilitate fabrication and to improve the characteristics of the finished resin. With many types of resins, a plasticizer is a necessary part and may form a major portion of the final product. The proper choice of plasticizer makes it possible to vary such important properties as flexibility, elasticity, elongation, moldability, and impact resistance.

A familiar type of plasticizer is the "solvent type," i. e., a plasticizer which dissolves or substantially dissolves in the resin to form a homogenous, plasticized product. Solvent type plasticizers greatly improve the flexibility and impact resistance of finished resins. However, to be satisfactory, a solvent type placticizer must be compatible with the resin to be plasticized, and must not "bleed," separate, or evaporate out of solution during the life of the resin, and in addition must sufficiently improve the resin without unduly weakening its tensile strength and lowering its softening point.

In our copending application, Serial No. 560,198, filed October 24, 1944, U. S. Patent 2,474,010, a method is disclosed for disruptively oxidizing the nitrile of an unsaturated fatty acid to break the double bond and produce thereby a mixture of an unsaturated carboxylic aliphatic nitrile and a short chain fatty acid. For example, an unsaturated nitrile is oxidized in a reaction which may be written as follows:

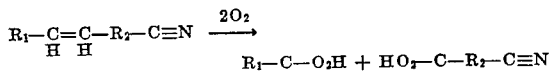

(where R₁ and R₂ are aliphatic radicals).

It has now been discovered that the mixed oxidation products are reactive with a di or polyhydric alcohol to form valuable plasticizers. To illustrate, the mixed products derived from the disruptive oxidation of an unsaturated nitrile may be esterified with a glycol to form a mixed neutral ester by a reaction which may be written as follows:

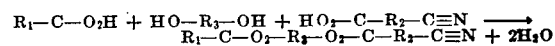

(where R₃ is an aliphatic radical and may contain one or more ethenoxy groups).

Esters may be disruptively oxidized in the same manner as nitriles, and the products of oxidation may be esterified with di or polyhydric alcohols. In either case plasticizers are produced by a similar pair of reactions. The reactions are as follows: where M is a radical which is a member of the group consisting of the nitrile and esters of short chain aliphatic alcohols having 1 to 12 carbon atoms, and

is a nitrile or an ester of an unsaturated fatty acid:

(1) 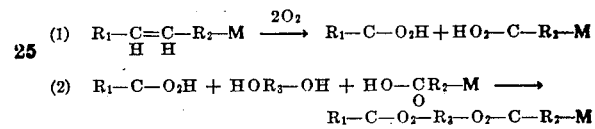

(2) R₁—C—O₂H + HOR₃—OH + HO—CR₂—M ⟶
            R₁—C—O₂—R₃—O₂—C—R₂—M

During this reaction, other esters are also believed to be formed. Short chain fatty acids of the formula

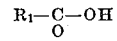

formed in the oxidation may be transformed into di-esters of the glycol. Di esters of the half nitriles or half esters may also occur. In addition slight amounts of by-product acids which may be formed in the oxidation also form esters both single and mixed.

If desired, the various esters produced may be separated one from another by any one of a variety of simple separation methods such as solvent separation or vacuum distillation. Each component of the esterification mixture individually is an excellent plasticizer. However, still more important from a cost viewpoint, the products in admixture display excellent plasticizing characteristics. Thus we prefer to use the esterified product containing a mixture of neutral esters for our plasticizer without the use of any separation steps, except removal of the oxidizing agent, and an excellent plasticizer is made in a simple, two stage process from an unsaturated aliphatic nitrile or ester and a polyhydric alcohol by (1) disruptively oxidizing the nitrile or ester to break the double bond and (2) esterifying the acids produced with a di or polyhydric alcohol.

In the past diesters of short chain fatty acids with dihydric alcohols have been used as plasticizers. In addition, esters of dicarboxylic acids and monohydric alcohols have been used. Both are excellent plasticizers but their preparation entails a number of complicated steps. One method of preparation of a dicarboxylic acid is by the oxidation of an unsaturated fatty acid to break the double bond and produce a mixture of a short chain fatty acid and a dicarboxylic acid. The components of this mixture in turn must be separated before being esterified and cannot be esterified together because, if a dihydric alcohol is used to esterify the mixture, a linear type polymer is formed with the dicarboxylic acid while if a monohydric alcohol is used, the short chain fatty acid forms simple mono-esters, which are unsatisfactory plasticizers from the standpoint of volatility. The method of this invention, on the other hand permits direct esterification of oxidation products, for one of the carboxyl groups of the dicarboxylic acid is rendered inactive to esterification by the presence of the nitrile or ester group; and the mixed oxidation products can be esterified directly with a dihydric alcohol without danger of the formation of linear polymers.

Our preferred esterification reagent is an aliphatic dihydric alcohol such as glycol, diethylene glycol, triethylene glycol, etc. In this application the term dihydric alcohol is intended to include the various members of the ethylene glycol series which contain one or more ethenoxy groups as well as other dihydric alcohols. However, other polyhydric alcohols such as glycerine can also be used to form plasticizers, but the plasticizers formed, generally speaking, are not as satisfactory as those produced by esterification with a glycol.

The plasticizers of this invention can be used alone or in combination with conventional plasticizers. Various separation and purification steps may be added to vary the qualities of the plasticizers produced and to remove unwanted materials.

Typical synthetic resins which can be plasticized with our plasticizers are polyvinyl butyral, polyvinyl acetate, ethyl cellulose, cellulose acetate butyral, and polyvinyl chloride. The following examples are given to illustrate the principles of the invention. Various modifications which can be made will be readily apparent to one skilled in the arts, and the invention is not intended to be limited except as set forth in the claims. In all of the examples, the proportions are by weight.

*Example 1*

500 parts of oleonitrile were heated and stirred at a temperature of between 80° centigrade and 90° centigrade with a solution consisting of 1900 parts sulphuric acid, 760 parts chromic acid, and 3040 parts water, until the mixture developed a green color and titration analysis indicated that all the chromic acid had been reduced. The mixture was allowed to stand until two layers formed. The green acid layer was removed by decantation and the layer of organic oxidation products was treated with 2% by weight of concentrated sulfuric acid at 80° centigrade to 90° centigrade to destroy a green coloration, then with hot water, and finally ½% by weight of dry soda ash was added to the mixed product to destroy any mineral acidity remaining and to stabilize the product. This intermediate oxidation product had an iodine value of 12 and a neutral equivalent of 215.

A diethylene glycol ester was prepared from the oxidation product, using a 15 percent excess of diethylene glycol. The ester product formed had a final acid number of 4.42.

24 parts of the ester product and 60 parts of polyvinyl chloride were thoroughly mixed and compression molded to give a plasticized, molded, flexible sheet.

*Example 2*

1000 parts of isobutyl oleate are oxidized with 17,100 parts of a chromic acid solution containing enough chromic acid (1203 parts) to give a 50 per cent excess of the calculated theoretical quantity to completely oxidize the ester at the double bond. The composition of this solution is approximately as follows:

| | Per cent |
|---|---|
| Chromic acid | 6.77 |
| Chromic sulphate | 13.2 |
| Sulphuric acid | 21.9 |
| Water | 58.1 |

An oxidizing solution of this composition normally is obtained by plant electrolytic regeneration of an aqueous chromic sulphate-sulphuric acid solution to the extent of 50 per cent to 55 per cent of maximum regeneration.

The above volume of oxidizing solution was divided into three parts and employed in three separate treatments. During each treatment the mixture was agitated mechanically and maintained at a temperature of between 80° centigrade and 90° centigrade. When the chromic acid solution from each treatment had become completely spent, as indicated by appearance and titration analysis, the spent solution was drawn off.

The oxidized product obtained in this manner was treated with 2 per cent by weight concentrated sulphuric acid at 90° centigrade with agitation to rid the product of a green coloration. This was followed by sufficient water washing to free the product of mineral acidity. The mixed oxidation product finally obtained had an iodine value of 215 and was a light colored oil.

800 parts of the oxidized mixture were esterified with 205 parts (theoretical amount) of diethylene glycol in the presence of carbon dioxide, which was bubbled through the mixture while it was slowly heated to a temperature of 250° centigrade. The mixture was heated for 8 hours. 20.5 additional parts (10 per cent of theory) diethylene glycol were added and the mixture was heated for 10 hours further at 250° centigrade to give a finished plasticizer which had an acid number of 1.9.

*Example 3*

270 parts of polyvinyl chloride were milled on a rubber mill with 180 parts of the plasticizer produced in Example 2. The sheet formed by milling was put in a press and compression molded at a temperature of 160° centigrade. A clear, straw-colored molded sheet was formed which, after 7 days, showed no exudation of the plasticizer. The sheet had a tensile strength of 1720 pounds per square inch. The elongation at break was 300 per cent.

*Example 4*

200 parts of a 10 per cent solution of polyvinyl butyral (20 parts polyvinyl butyral, 36 parts toluol, and 144 parts isopropyl alcohol) were mixed with 6 parts of the plasticizer produced in Example 2. The mixture was flowed onto a glass sheet. After evaporation of the solvents, a clear, water-white film remained showing complete compatibility.

*Example 5*

100 parts of polyvinyl acetate and 15 parts of the plasticizer produced in Example 2 were heater and stirred together at a temperature of approximately 170° centigrade until thoroughly dispersed. The mixture was cooled to give a clear yellow plastic showing no exudation of the plasticizer.

*Example 6*

200 parts of a solution of ethyl cellulose (14 centipoise ethyl cellulose containing 30 parts ethyl cellulose, 34 parts n-butyl alcohol, and 136 parts xylol) were mixed and shaken with 15 parts of the plasticizer produced in Example 2. The mixture was flowed onto a glass plate. After evaporation of the solvents, a clear water-white film of plasticized ethyl cellulose remained.

*Example 7*

200 parts of a 10 per cent solution of cellulose acetate butyral (20 parts cellulose acetate butyral, 36 parts methyl acetate, and 144 parts methyl cellulose acetate) were stirred with 10 parts of the plasticizer produced in Example 2. The mixture was flowed on a glass plate and gave, after evaporation of the solvents, a clear water-white film of plasticized resin.

Having described our invention, we claim:

1. A new composition of matter comprising the mixed ester of an aliphatic dihydric alcohol with a fatty acid and a carboxylic aliphatic nitrile.

2. A plasticizer comprising the mixed ester of an aliphatic dihydric alcohol with a fatty acid and a carboxylic aliphatic nitrile.

3. A new composition of matter comprising the mixed ester of an aliphatic dihydric alcohol with a fatty acid having from 1 to 12 carbon atoms and a carboxylic aliphatic nitrile.

4. A method of forming a plasticizer comprising disruptively oxidizing an unsaturated aliphatic nitrile to break the double bond without affecting the nitrile group and esterifying the oxidation products with an aliphatic dihydric alcohol.

5. A method of forming a plasticizer which comprises disruptively oxidizing a compound of the formula

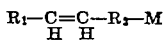

to cleave the double bond, in which $R_1$ and $R_2$ are aliphatic radicals and M is a member of the group consisting of the nitrile and esters of aliphatic alcohols having 1 to 12 carbon atoms, and then esterifying the mixed oxidation products with an aliphatic dihydric alcohol.

6. A new composition of matter which has the formula $R_1-C-O_2-R_3-O_2-C-R_2-M$ in which $R_1$ and $R_2$ are aliphatic radicals, M is a member of the group consisting of the nitrile and esters of aliphatic alcohols having 1 to 12 carbon atoms, and $R_3$ is an aliphatic radical residue from an aliphatic dihydric alcohol.

7. A method of forming a plasticizer which comprises disruptively oxidizing a member of the group consisting of the nitriles and esters of monounsaturated fatty acids to cleave the double bond and then esterifying the mixed oxidation products with an aliphatic dihydric alcohol.

8. A method of forming a plasticizer which comprises disruptively oxidizing a member of the group consisting of the nitrile of oleic acid and esters of oleic acid with aliphatic alcohols having one to twelve carbon atoms to cleave the double bond and then esterifying the mixed oxidation products with an aliphatic dihydric alcohol.

9. A method of forming a plasticizer which comprises disruptively oxidizing an ester of oleic acid and an aliphatic alcohol having one to twelve carbon atoms to cleave the double bond and then esterifying the mixed oxidation products with an aliphatic dihydric alcohol.

10. A method of forming a plasticizer which comprises disruptively oxidizing an ester of oleic acid and an aliphatic alcohol having three to four carbon atoms to cleave the double bond, and then esterifying the mixed oxidation products with an aliphatic dihydric alcohol.

11. A method of forming a plasticizer which comprises disruptively oxidizing an ester of oleic acid and an aliphatic alcohol having four carbon atoms to cleave the double bond, and then esterifying the mixed oxidation products with diethylene glycol.

12. A new composition of matter comprising the mixed ester of a dihydric aliphatic alcohol with a fatty acid having one to twelve carbon atoms and a half ester of an aliphatic dicarboxylic acid and an aliphatic alcohol having one to twelve carbon atoms.

13. A new composition of matter comprising the mixed ester of an aliphatic dihydric alcohol with a fatty acid having one to twelve carbon atoms and a half ester of azelaic acid and an aliphatic alcohol having one to twelve carbon atoms.

LATIMER D. MYERS.
J. D. FITZPATRICK.

REFERENCES CITED

The following references are of record in the file of this patent:

UNITED STATES PATENTS

| Number | Name | Date |
| --- | --- | --- |
| 2,120,934 | Groff | June 14, 1938 |
| 2,305,103 | Osgood | Dec. 15, 1942 |
| 2,380,061 | Moury | July 10, 1945 |